(12) United States Patent
Thompson et al.

(10) Patent No.: US 8,984,760 B1
(45) Date of Patent: Mar. 24, 2015

(54) FORCE CONTROLLED GO/NO-GO MEASUREMENT SYSTEM

(71) Applicant: The Boeing Company, Chicago, IL (US)

(72) Inventors: Brian A. Thompson, Media, PA (US); Donald E. Henry, Garnet Valley, PA (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 13/758,801

(22) Filed: Feb. 4, 2013

(51) Int. Cl.
| | |
|---|---|
| *G01B 3/00* | (2006.01) |
| *G01B 5/00* | (2006.01) |
| *G01L 1/00* | (2006.01) |
| *G01B 5/12* | (2006.01) |
| *G01B 3/14* | (2006.01) |
| *G01B 3/22* | (2006.01) |
| *G01B 5/20* | (2006.01) |
| *G01B 7/28* | (2006.01) |
| *G01B 9/08* | (2006.01) |
| *G01B 11/24* | (2006.01) |
| *G01B 13/16* | (2006.01) |
| *G01B 15/04* | (2006.01) |
| *G01B 21/20* | (2006.01) |
| *G01B 3/50* | (2006.01) |

(52) U.S. Cl.
CPC .... *G01L 1/00* (2013.01); *G01B 5/12* (2013.01)
USPC .... 33/542; 33/501.12; 33/501.18; 33/501.45; 33/501.08; 33/501.11; 33/501.19

(58) Field of Classification Search
CPC .............. G01B 5/08; G01B 3/26; G01B 3/50; G01B 3/30
USPC .................... 33/542, 501.45, 501.08, 501.19, 33/501.12, 501.11, 501.18
See application file for complete search history.

(56) References Cited

U.S. PATENT DOCUMENTS

| | | | | |
|---|---|---|---|---|
| 2,493,233 | A | * | 1/1950 | Dower ........................ 33/501.45 |
| 2,514,956 | A | * | 7/1950 | Kuebler ..................... 33/501.45 |
| 2,861,347 | A | * | 11/1958 | Von Tarnik ................ 33/501.45 |
| 4,200,987 | A | * | 5/1980 | Schmitt ........................ 33/501.4 |
| 4,858,330 | A | * | 8/1989 | Larsen ......................... 33/199 R |

* cited by examiner

*Primary Examiner* — Peter MacChiarolo
*Assistant Examiner* — Rhyan C Lange
(74) *Attorney, Agent, or Firm* — Felix L. Fischer

(57) ABSTRACT

A go/no-go gauge for hole tolerance measurement incorporates a handle, a first pin having a first diameter extending from a first end of the handle and a second pin having a second diameter extending from a second end of the handle. A force measurement element is disposed between the ends of the handle and configured to provide an indication upon exceeding a predetermined force level when attempting to insert one of the pins into a hole.

20 Claims, 7 Drawing Sheets

FORCE CONTROLLED GO/NO-GO MEASUREMENT SYSTEM

BACKGROUND INFORMATION

1. Field

Aspects of the disclosure relate generally to openings for receiving fasteners and more particularly to inspection gauges therefor.

2. Background

Structural fabrication using fasteners requires matching of the fasteners and the sizes of the holes through which the fasteners are inserted. Particularly in high stress environments, proper dimensional tolerances of hole diameters during assembly are critical to assure that a selected fastener system will have desired structural properties in use. Holes may be undersize or oversize with respect to defined tolerances. In fabricating structures, such as aircraft or other complex systems where tens of thousands of fastener holes may be present, inspection of holes to assure that their dimensions are within specified tolerances can be extremely time consuming. Additionally, the repetitive nature of such measurements may require secondary indications of acceptability to assure that accuracy of inspection is maintained.

Wooden or metal dowels to be inserted into fastener holes ("go" gauges), or to be sized such that the dowels are larger than a properly sized hole ("no-go" gauges), have been used as devices for hole inspection for many years. However, a dowel having a diameter sized for no-go may often be "pushed (forced) through" a hole, deforming itself and/or the hole sufficiently to be received into the hole. Different operators exert differing amounts of force when attempting to insert a gauge into a hole. This variance can cause failed inspections. The force necessary to create "push-through" or "force-through" may not be excessive when the no-go gauge is used on a hole with a very close diameter tolerance and the dowel is accordingly sized to be only slightly larger than the hole, particularly a hole formed in soft or somewhat elastic materials.

SUMMARY

It is therefore desirable to provide a go/no-go gauge which incorporates force detection in holes having both upper and lower dimensional tolerances.

One or more examples disclosed herein provide a go/no-go gauge for hole tolerance measurement incorporating a handle, a first pin having a first diameter extending from a first end of the handle and a second pin having a second diameter extending from a second end of the handle. A force measurement element is disposed between the ends of the handle and is configured to provide an indication to an operator if a predetermined force threshold is exceeded when attempting to insert one of the pins into a hole.

An exemplary go/no-go gauge includes a handle with a first half and a second half. A first pin having a first diameter extends from a distal end of the first half of the handle and a second pin having a second diameter extends from a distal end of the second half of the handle. A load cell is disposed between proximal ends of the first half and the second half of the handle and is configured to provide an indication to an operator should a force exceeding a specified level be applied when attempting to insert one of the pins into a hole.

One aspect of the present disclosure relates to a method for measuring a dimensional tolerance of a hole. The method includes determining a force threshold for avoiding a force-through of at least one of a lower-tolerance-measurement pin and an upper-tolerance measurement pin of a gauge system based on the composition and thickness of the material in which the hole is present. An attempt to insert a lower-tolerance measurement pin into the hole is made. The hole is accepted as meeting a lower dimensional tolerance (corresponding, e.g., to a minimum allowable diameter) if the pin is received in the hole without an indicating signal being induced by exceeding the force threshold.

The features, functions, and advantages that have been discussed can be achieved independently in various embodiments of the present disclosure or may be combined in yet other embodiments further details of which can be seen with reference to the following description and drawings.

DETAILED DESCRIPTION

Figure 1:
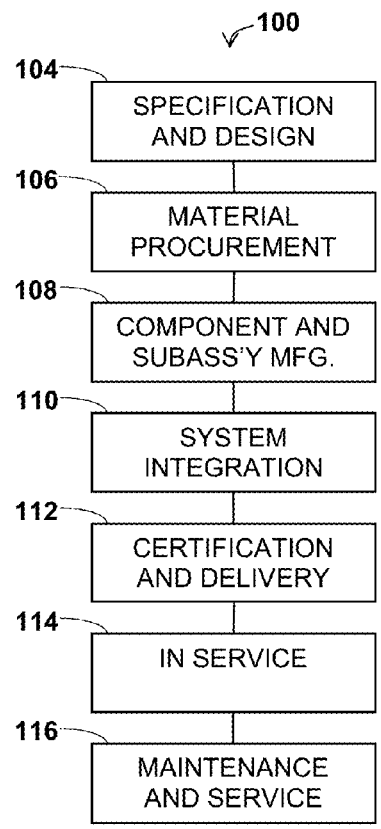
FIG. 1 is a flow diagram of aircraft production and service methodology.
Figure 2:
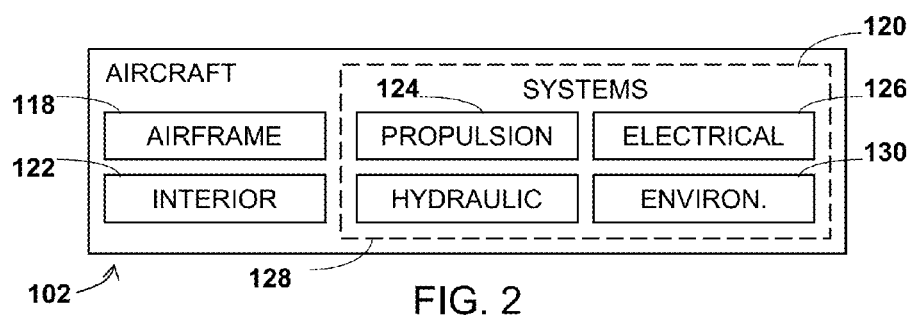
FIG. 2 is a block diagram of an aircraft.

Referring more particularly to the drawings, examples of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more aspects of the apparatus, method, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
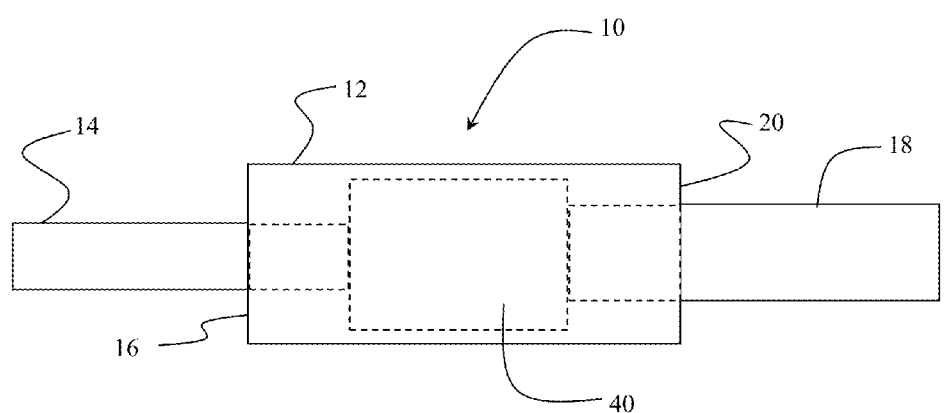
FIG. 3 is a side view illustrating one aspect of the disclosure.

The examples described herein provide a go/no-go measurement system to determine both the maximum and the minimum allowable diameters of a hole employed for fastener or other assembly requirements in the methods or systems of an aircraft as defined in FIGS. 1 and 2 and described above or any similar structural assembly. As shown in FIG. 3, a gauge system 10 incorporates a handle 12 for grasping by a technician or inspector. The handle 12 may be cylindrical, hexagonal or other convenient shape for grasping and may have a textured or contoured surface for enhanced grip. An example hexagonal handle has flat dimensions of ¼" to 1¼". A first dowel or pin 14 for checking the minimum diameter (the lower dimensional tolerance) of a hole extends from a first end 16 of the handle 12 and a second dowel or pin 18 for checking the maximum diameter (the upper dimensional tolerance) of a hole extends from a second end 20 of the handle 12 (pins 14 and 18 are shown with exaggerated size difference for clarity).

Figure 4:
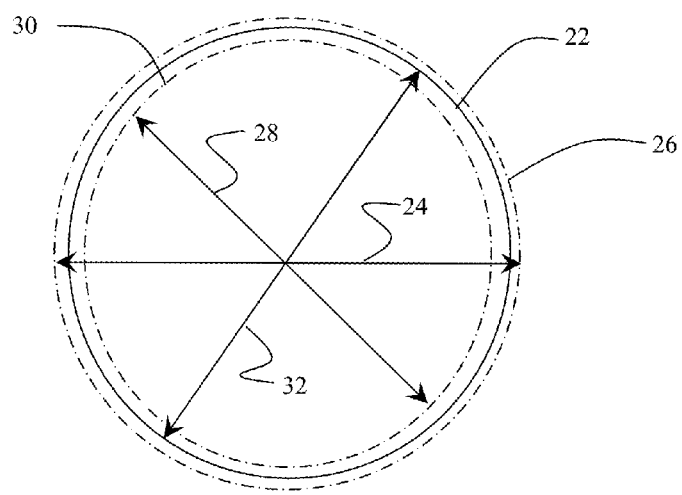
FIG. 4 demonstrates the geometry of hole tolerances.

Measurement of hole sizing is accomplished based on tolerances established for hole size as shown in FIG. 4. For a desired hole 22, a maximum diameter 24 corresponding to a hole size 26 and a minimum diameter 28 corresponding to a hole size 30 are established. Actual diameter 32 of the hole 22 will be less than diameter 24 and greater than diameter 28 to be acceptable. For the gauge system 10, the pin 14 will have a diameter corresponding to the lower tolerance (minimum) diameter 28 and the pin 18 will have a diameter corresponding to the higher tolerance (maximum) diameter 24. Ends of the pins may be tapered or chamfered with conical or spherical surfaces to allow self-centering of the pins in the holes being measured.

To test the hole, a technician or inspector grasps the gauge system 10 by the handle and attempts to insert pin 14 into the hole. If the pin is received in the hole, the hole diameter is equal to or larger than the minimum allowable diameter and therefore meets the lower tolerance. The technician or inspector then reverses the gauge system 10 and attempts to insert the pin 18 in the hole. As long as the pin 18 is not received within the hole, the maximum allowable diameter does not exceed the upper tolerance.

Figure 5:
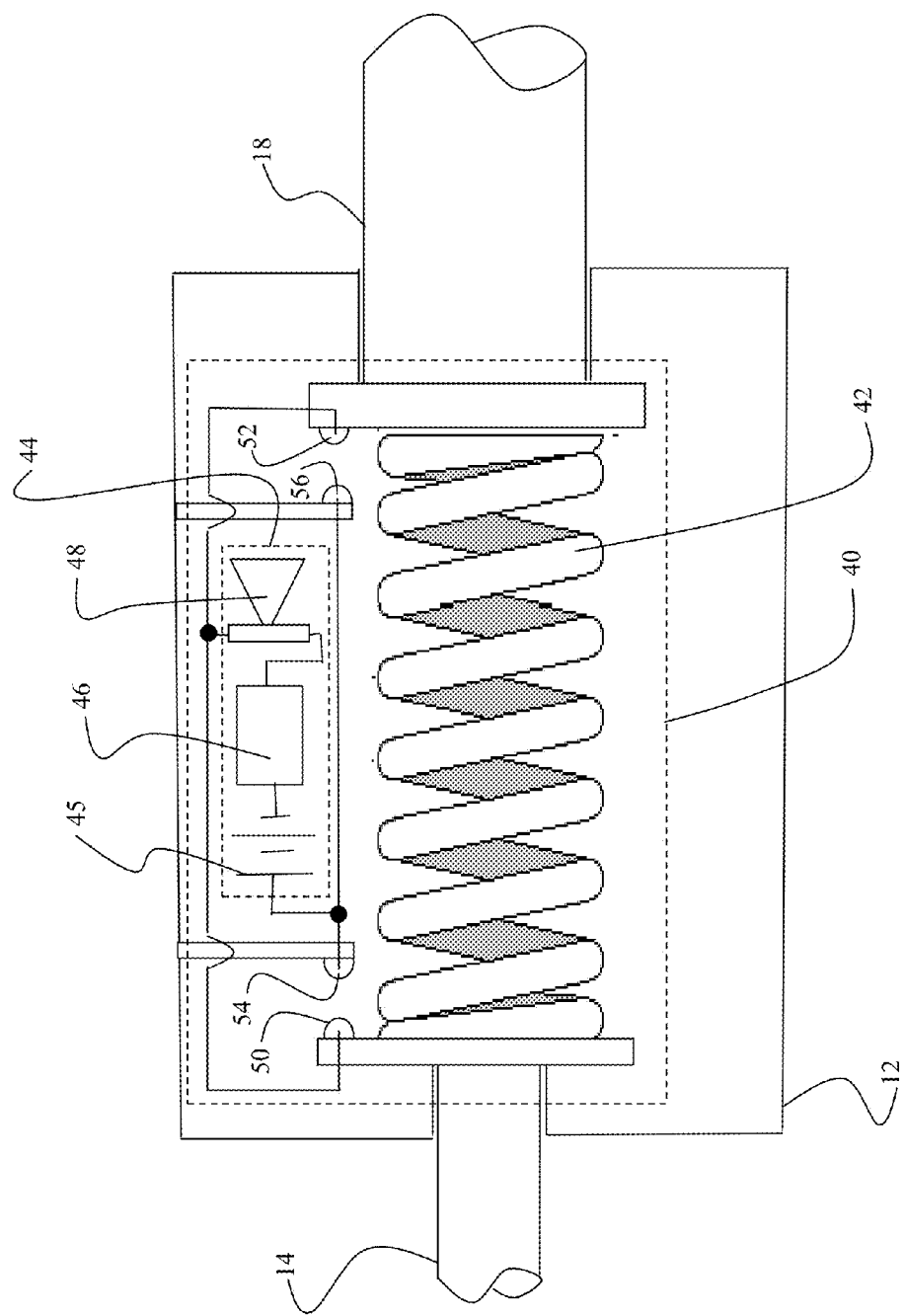
FIG. 5 is a schematic block diagram of the aspect of FIG. 3.

The example represented in FIG. 3 incorporates a force measurement element 40 within the handle 12. Element 40 measures force applied to the pins 14 and 18. Referring now to FIG. 5, the force measurement element 40 may, in one aspect, include a strain element, which in the example shown is a resilient spring 42, and a sound circuit 44 which is activated when the spring 42 exceeds a predetermined strain corresponding to a selected force applied to the pins. The threshold force may be determined analytically or empirically to prevent "force-through" of the pins in close tolerance holes. For the example shown in FIG. 5, the sound circuit includes a battery 45 and trim electronics 46 connected to a speaker 48 with contacts 50 and 52, associated with the pins 14 and 18, and contacts 54 and 56, associated with a position of the strain element deflected with a selected force. Engagement of contacts 50 and 54 or 52 and 56 completes the battery and speaker circuit to provide a sound indication that the predetermined strain level (corresponding to the compression distance of the spring 42) has been reached. While a single battery and speaker circuit is shown, a separate circuit for each pin may be employed or separate trim circuitry may be used to allow a different tone associated with each pin.

Figure 6:
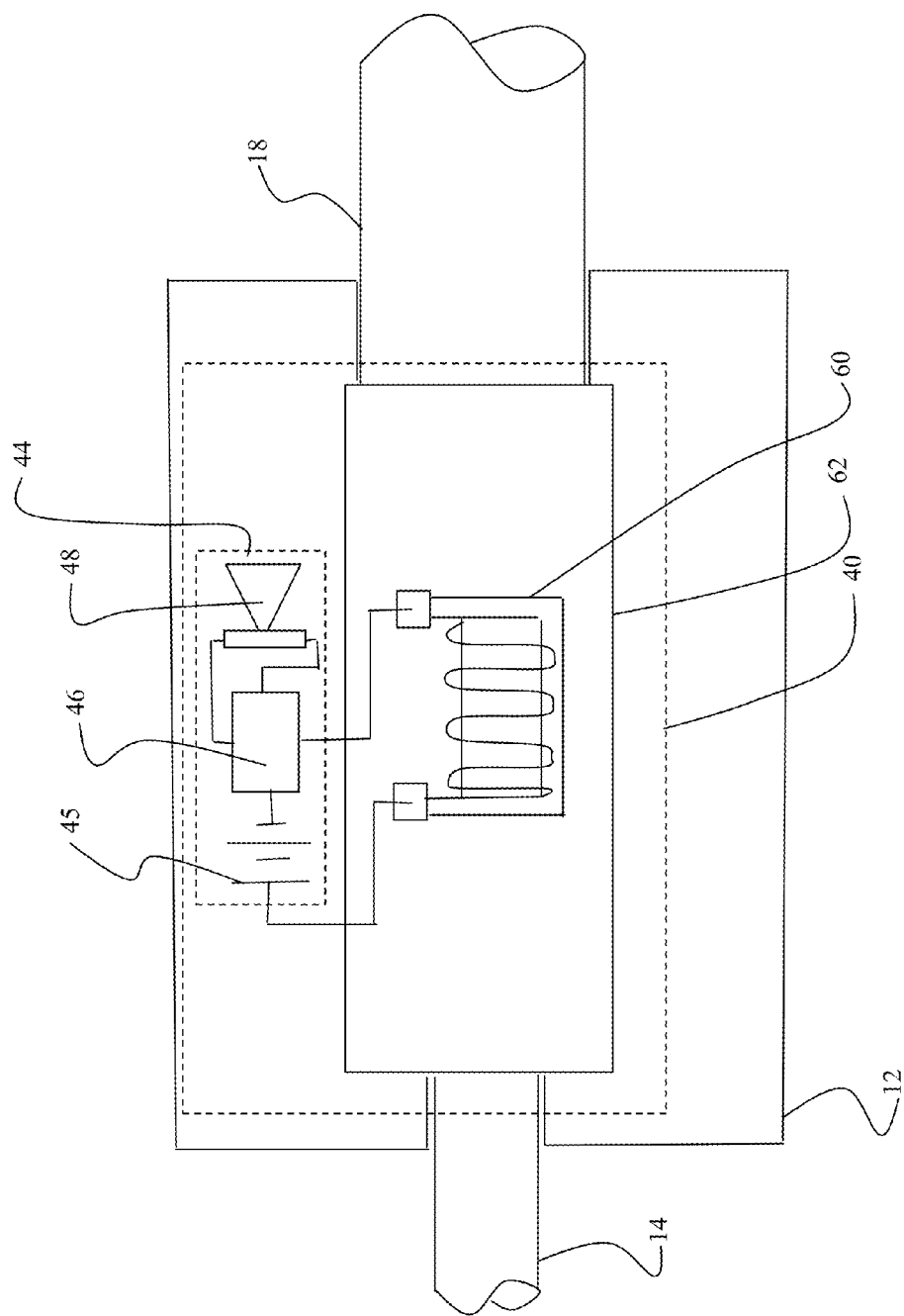
FIG. 6 is a schematic block diagram of an alternative aspect.

An alternative example is shown in FIG. 6, employing a strain gauge 60 as the strain element (orientation of the strain gauge is exemplary only). Pins 14 and 18 are connected to a compression bar or tube 62 on which the strain gauge 60 is mounted. Force on the pins creates strain in the tube 62 which is measured by the strain gauge 60. As with the prior example, the battery 45 and the speaker 48 are present in the sound circuit 44 which incorporates trim electronics 46 measuring resistivity in the strain gauge for determination of a strain threshold to activate the speaker. The trim electronics 46 may be adjustable to allow matching of the strain threshold to various pin/hole sizes for selected force threshold. While shown as a single strain gauge, force measurement element 40 may employ separate strain gauges associated with each pin.

Figure 7A:
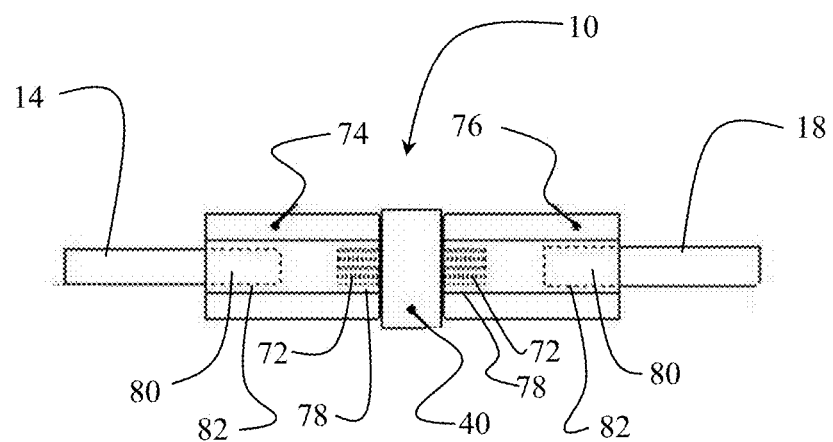
FIG. 7A is a side view of a physical implementation of the aspect of FIG. 6.
Figure 7B:
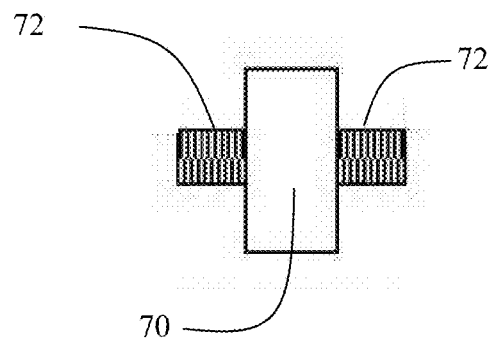
FIG. 7B is a side view of a physical implementation of the strain sensing element for the aspect of FIG. 6.

As shown in FIGS. 7A and 7B, the gauge system 10 may be modularized with the force measurement element 40, incorporating either a mechanical force sensing arrangement, as described with respect to the example of FIG. 5, or a strain-gauge sensing arrangement, as described with respect to the example of FIG. 6, self-contained with sensor, battery and electronics in a package 70. Threaded mating studs 72 allow the package 70 to be mounted in handle portions 74 and 76, which incorporate mating threaded bores 78 to receive the studs 72. Handle portions 74 and 76 may integrally incorporate pins 14 and 18 respectively, the pins may be press fit into receiving bores, or the pins may incorporate threaded ends 80 received in pin-mating bores 82. This configuration allows conversion of the gauge system 10 with varying size pins for different hole sizes. An exemplary load cell applicable for use in the example of FIGS. 6 and 7A, 7B is a DDE Miniature In-Line Tension & Compression Load Cell available from Omni Instruments LLC, 114 Airport North Office Park, Fort Wayne, Ind. 46825. In certain examples, a variable or adjustable load cell may be employed to accommodate a change in desired force level depending on materials or other considerations.

Figure 8:
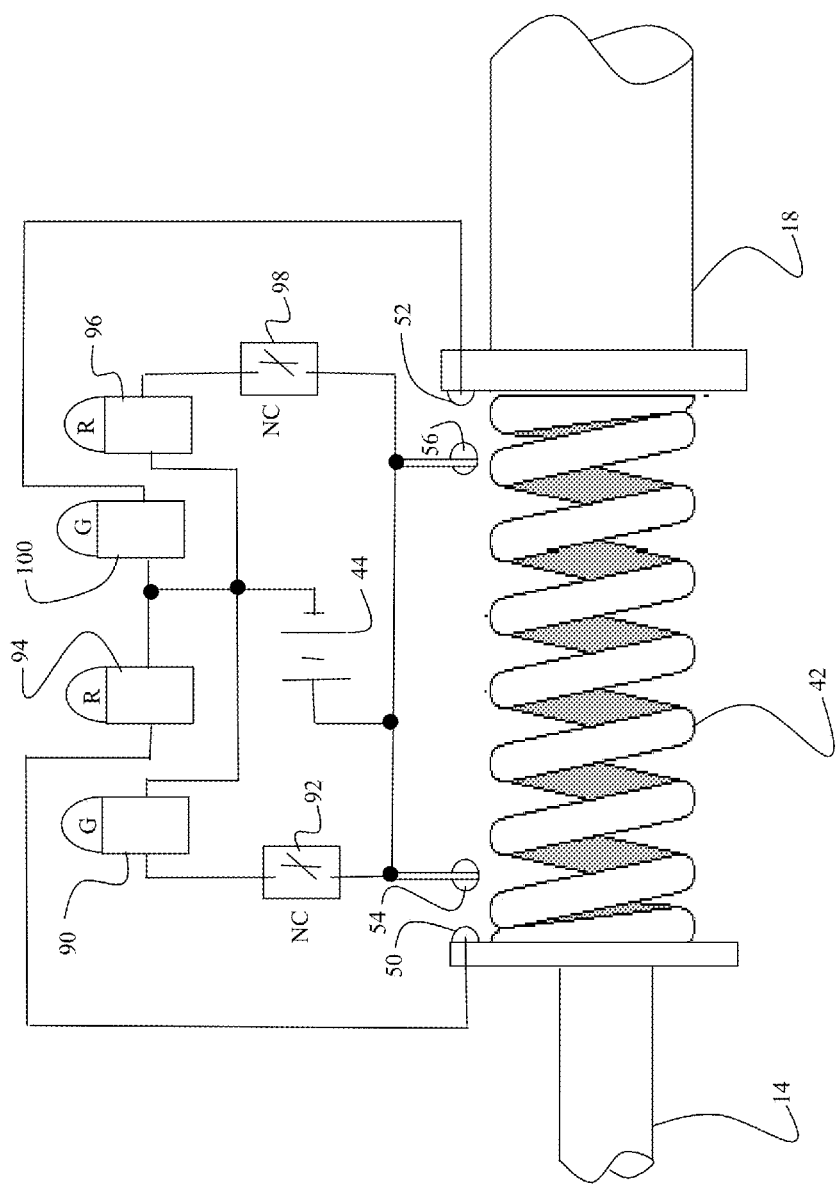
FIG. 8 is a schematic for an alternative visual indication system.

The force measurement element 40 in the examples described employs a speaker for audible signaling of the force threshold. In alternative examples, a visual indicator, such as one or more lamps or light emitting diodes (LEDs), may be employed. As an example shown in FIG. 8, a green LED associated with the lower tolerance pin 14 may be illuminated through a normally closed (NC) relay 92 and remain illuminated as pin 14 is inserted into the hole, unless or until the force threshold is exceeded and contact 50 engages contact 54, at which point a red LED 94 is illuminated (and NC relay 92 opens, extinguishing green LED 90). Similarly, for the upper tolerance pin 18, a red LED 96, powered through NC relay 98, is illuminated if no force is present on the pin 18. LED 96 remains illuminated if pin 18 is insertable through the hole without reaching the force threshold. A green LED 100, associated with pin 18, is illuminated upon exceeding the force threshold by contacting of contacts 52 and 56 (also opening NC relay 98 and extinguishing red LED 96), indicating a hole with diameter equal to or below maximum allowable diameter (the upper tolerance). Combination of the LED and sound circuits may be employed or the LEDs may be replaced by trim circuitry to produce differing sound frequency corresponding to the low tolerance pin exceeding the force threshold as a failure indication and the high tolerance pin maintaining the force threshold as an allowance indication.

Figure 9:
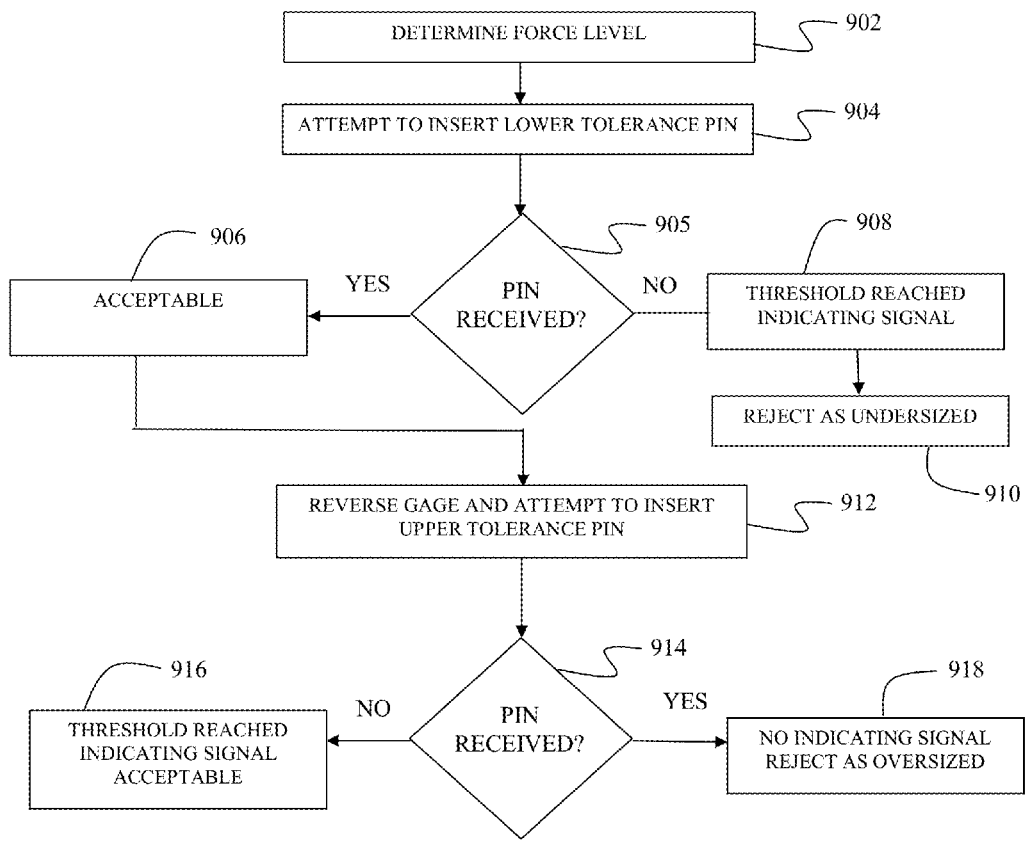
FIG. 9 is a flow chart of a method of implementing the example aspects for hole go/no go size confirmation.

The examples disclosed herein allow a method of hole tolerance determination as shown in FIG. 9. A force level avoiding "force-through" is predetermined for a lower-tolerance-measurement pin and an upper-tolerance measurement pin of a gauge system based on the composition and thickness of the material in which the hole is present (block 902). A technician or inspector attempts to insert the lower tolerance pin 14 into the hole (block 904). If the pin is received in the hole (block 905), the hole diameter is larger than the minimum allowable diameter (lower tolerance) and therefore acceptable with respect to low tolerance (block 906). If the force threshold is reached, an indicating signal (audible or visual as described for the various embodiments as a warning signal) is issued by the force measurement element, (block 908) and the hole is rejected as undersize (block 910). The technician or inspector then reverses the gauge system and attempts to insert the upper tolerance pin 18 in the hole (block 912). As long as the pin 18 is not received within the hole (block 914), and the force threshold is exceeded, resulting in an indicating signal (either audible or visual as described for the various embodiments as a confirmation signal) the diameter is less than the maximum allowable diameter (upper tolerance) and therefore acceptable as being within the upper tolerance (block 916). If the upper tolerance pin 18 is received through the hole and no indicating signal is present the hole is rejected as oversize (block 918).

Having now described various aspects of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A go/no-go gauge for hole tolerance measurement comprising:
    a handle;
    a first pin having a first diameter extending from a first end of said handle;
    a second pin having a second diameter extending from a second end of said handle; and
    a force measurement element, said force measurement element disposed between the ends of said handle and configured to provide an indication upon exceeding a predetermined force threshold when attempting to insert one of said pins into a hole.

2. The go/no-go gauge defined in claim 1 wherein the force measurement element includes:
    at least one spring, said spring engaging and compressible to the predetermined force threshold by the first pin.

3. The go/no-go gauge defined in claim 2 wherein the at least one spring in the force measurement element is engaging and compressible to the predetermined force threshold by the second pin.

4. The go/no-go gauge defined in claim 3 wherein the force measurement element further comprises:
    a first circuit contact closed upon compression of the spring to the predetermined force threshold by the first pin; and
    a sound generation circuit operable upon closing of the first circuit contact.

5. The go/no-go gauge defined in claim 4 wherein the force measurement element further comprises:
    a second circuit contact closed upon compression of the spring to the predetermined force threshold by the second pin; and wherein
    the sound generation circuit is operable upon closing of the second circuit contact.

6. The go/no-go gauge defined in claim 1 wherein the force measurement element includes:
    a compression tube engaged at a first end by the first pin, and
    at least one strain gauge mounted on the compression tube.

7. The go/no-go gauge defined in claim 6 wherein the compression tube is engaged at a second end by the second pin.

8. The go/no-go gauge defined in claim 7 wherein the force measurement element further comprises a sound generation circuit operable upon detection of a predetermined strain on the strain gauge.

9. The go/no-go gauge as defined in claim 3 wherein the force measurement element further comprises:
    a first circuit contact closed upon compression of the spring to the predetermined force threshold by the first pin; and
    a light emitting diode (LED) circuit activated upon closing of the first circuit contact.

10. The go/no-go gauge as defined in claim 9 wherein the force measurement element further comprises:
    a second circuit contact closed upon compression of the spring to the predetermined force threshold by the second pin; and
    a second LED circuit activated upon closing of the second circuit contact.

11. The go/no-go gauge as defined in claim 10 wherein the light emitting diode circuit comprises a green LED connected to a normally closed (NC) relay, wherein said NC relay is deactivated by closing of the first circuit contact, and a red LED is connected for activation by closure of the first circuit contact.

12. The go/no-go gauge as defined in claim 11 wherein the light emitting diode circuit further comprises a second red LED connected to a second normally closed (NC) relay, wherein said second NC relay is deactivated by closing of the second circuit contact and a second green LED is connected for activation by closing of the second circuit contact.

13. A go/no-go gauge comprising:
    a handle comprising a first half and a second half;
    a first pin having a first diameter extending from a distal end of said first half of said handle;
    a second pin having a second diameter extending from a distal end of said second half of said handle; and
    a load cell, said load cell disposed between proximal ends of said first half and said second half of said handle and configured to provide an indication to an operator should a force exceeding a specified level be applied when attempting to insert one of said pins into a hole.

14. The go/no-go gauge as defined in claim 13 wherein the load cell incorporates threaded studs received in threaded bores in the first half and second half of the handle.

15. The go/no-go gauge as defined in claim 13 wherein the first pin incorporates a threaded end received in a threaded pin mating bore in the first half of the handle and the second pin incorporates a threaded end received in a threaded pin mating bore in the second half of the handle.

16. A method for go/no-go gauging of a hole comprising:
    determining a force threshold for avoiding a force-through of at least one of a lower-tolerance-measurement pin and an upper-tolerance measurement pin of a gauge system based on a composition and a thickness of a material in which the hole is present;

attempting to insert a lower-tolerance measurement pin into the hole;

accepting the hole as meeting a lower tolerance if the lower-tolerance measurement pin is received in the hole without reaching the force threshold during the previous step, wherein reaching the force threshold induces an indicating signal.

17. The method of claim 16 further comprising:

reversing the gauge system;

attempting to insert the upper-tolerance measurement pin in the hole; and accepting the hole as meeting an upper tolerance if the force threshold during the previous step is reached, indicating that the upper-tolerance measurement pin is not received in the hole, wherein reaching the force threshold induces the indicating signal.

18. The method of claim 17 further comprising:

rejecting the hole as oversize if the upper-tolerance measurement pin is received in the hole and the indicating signal is not present.

19. The method of claim 16 wherein the indicating signal is audible.

20. The method of claim 16 wherein the indicating signal is visible.

* * * * *